H. J. YOUNGBLOOD.
ELECTRIC HEATER.
APPLICATION FILED OCT. 9, 1919.
1,363,947.
Patented Dec. 28, 1920.
2 SHEETS—SHEET 1.
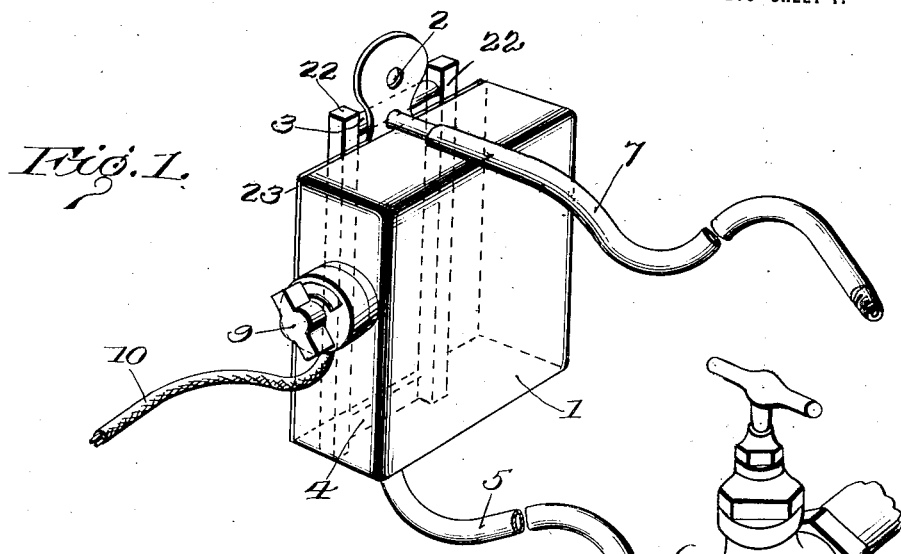
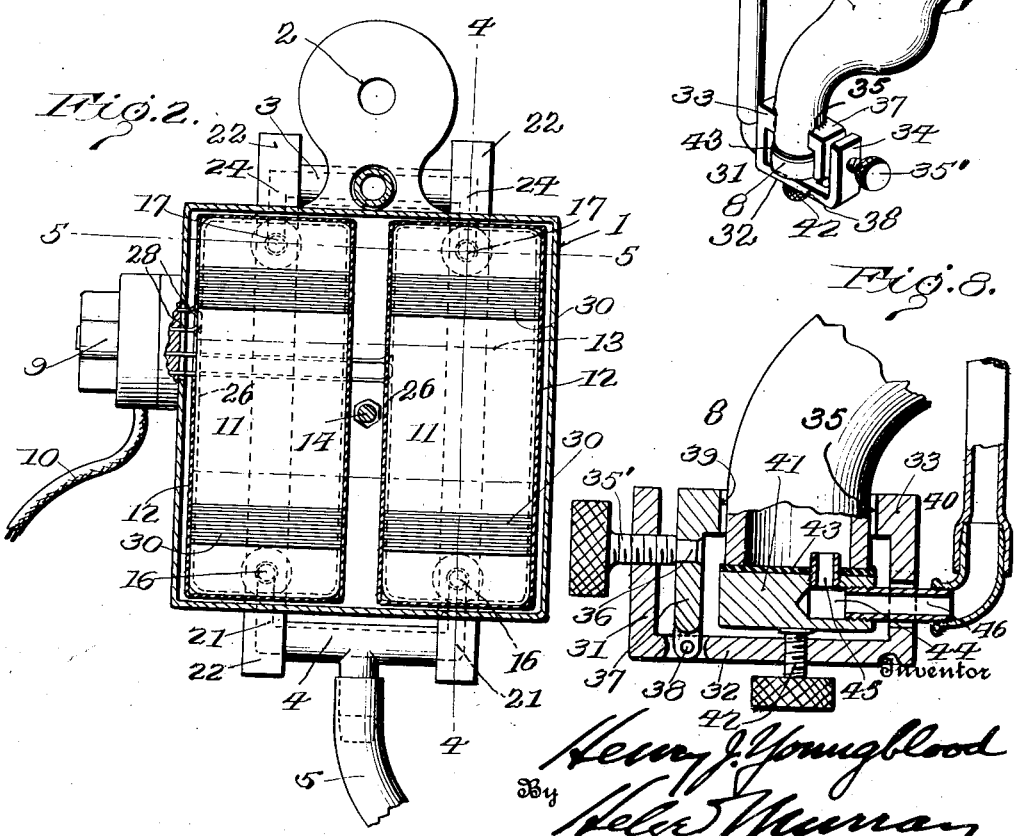

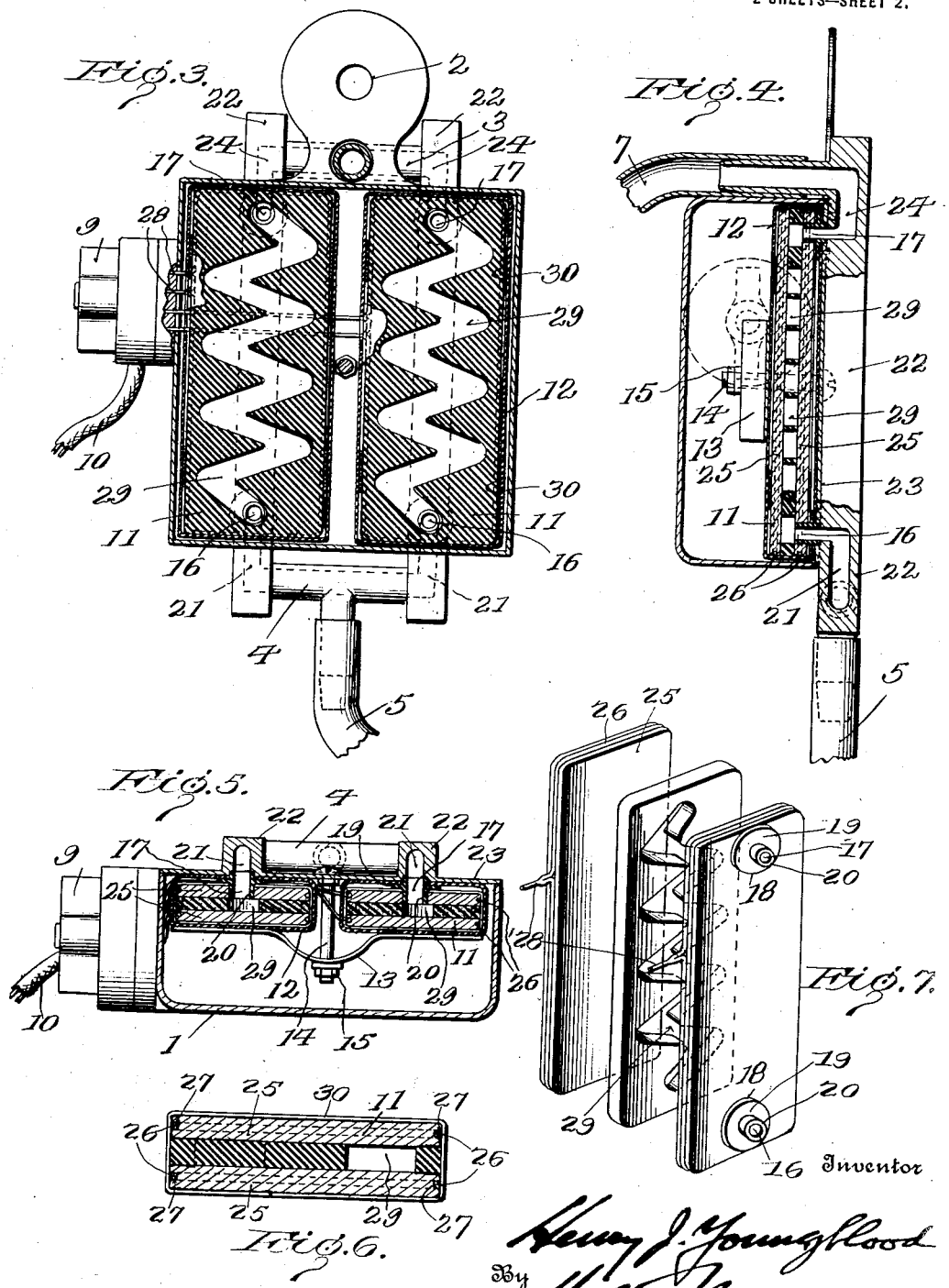

UNITED STATES PATENT OFFICE.

HENRY J. YOUNGBLOOD, OF LOS ANGELES, CALIFORNIA, ASSIGNOR TO YOUNGBLOOD ELECTRIC HEATER CORPORATION, OF BUFFALO, NEW YORK, A CORPORATION OF NEW YORK.

ELECTRIC HEATER.

1,363,947.  Specification of Letters Patent.  Patented Dec. 28, 1920.

Application filed October 9, 1919. Serial No. 329,534.

*To all whom it may concern:*

Be it known that I, HENRY J. YOUNGBLOOD, a citizen of the United States, residing at Los Angeles, in the county of Los Angeles and State of California, have invented certain new and useful Improvements in Electric Heaters, of which the following is a specification, reference being had therein to the accompanying drawings.

This invention relates to an improved electric heater, and contemplates more particularly an electric heater designed to be attached to an ordinary spigot or faucet for instantaneously heating the water.

An object of my invention is to produce an electric heater which can be readily supplied with direct or alternating current, without affecting the successful operation of the device, and thereby produce an intensified degree of heat without any resulting danger, such, for example as a blow-out from the voltage which may be used.

Another object of the invention is to produce a heating unit which is constructed to operate under a low voltage, such for example, as a storage battery, or on the other hand, under a high voltage, generator, or the like, without changing or supplementing the device.

Another object of the invention is the production of an electric heater in which the heat produced is dependent upon the flow of the water through the heating units after the current has been turned into the heating unit.

A further object of the invention is to produce an electric heater in which the heating element is composed of a built-up structure consisting of oppositely arranged and specially formed plates of positive and negative polarity, between which the water is permitted to flow in a zig-zag manner, thereby insuring the greatest possible heating efficiency and a minimum consumption of current.

A still further object of my invention is the production of a heating unit composed of a material consisting of antimony, powdered copper and quick silver or mercury, mixed with a suitable combining agent or material, and compressed into plates forming the side walls of the chamber through which the water to be heated passes.

A still further object of my invention resides in the method of producing the heating unit which consists in mixing the aforesaid materials, compressing them to the desired degree of thickness, shellacking or enameling the same and subsequently baking them in an oven.

With these and other objects in view, the invention further consists in the construction of the several parts hereinafter described and pointed out in the appended claims.

In the accompanying drawings illustrating an embodiment of my improved heating device, and in which corresponding reference characters designate similar parts, Figure 1 is a perspective view of my improved heater as applied to any ordinary faucet;

Fig. 2 is a front elevation of the heating elements, showing the insulation and casing in section;

Fig. 3 is a vertical sectional view through the heating units or elements;

Fig. 4 is a vertical sectional view on the line 4—4 of Fig. 2;

Fig. 5 is a horizontal, sectional view on the line 5—5 of Fig. 2;

Fig. 6 is an enlarged horizontal, sectional view through one of the heating units;

Fig. 7 is a detailed perspective view showing the component parts of the heating unit in separated relation; and Fig. 8 is a transverse, sectional view through the faucet attaching device.

The present invention has been primarily designed as an instantaneous heating device which can be applied in any household to the ordinary cold water spigot or other water distributing station and operated, by the use of either direct or alternating or other species of electric current to, produce an intensified heat without danger of blow-outs, or other electrical trouble, now experienced whenever an effort is made to heat water to a high degree of heat, such for example, as boiling water, vapor, or steam by small devices of this character.

In use the heater is preferably attached to the side of the wall or any other convenient support, and the flexible hose connection securely attached to the spigot. To the discharge end of the device any form of nozzle or spray device may be secured, or the water may be allowed to flow freely through the hose without interruption of any form. A switch is usually arranged convenient to the heating device as shown. Within the heating device I have shown a plurality of heating units, the construction of which will hereinafter be set forth.

Referring to the drawings, the heating device 1 is preferably in the form of a box having a suitable attaching eye 2 for engaging a hook or similar device. Water distributing manifolds 3 and 4 are shown at the top and bottom of the box, respectively, and upon the outside thereof.

The bottom manifold 4 receives the flexible hose connection 5 from the faucet 6, and the top manifold receives the heated water from the heating units and distributes it to the flexible hose 7 for use either through an attached nozzle, spray, or open pipe.

The faucet attaching device 8 comprises a novel construction from which the flexible hose 6 extends to the bottom manifold 4, and will be described hereinafter.

The electrical switch 9 is preferably provided on the side of the box or casing of the heating device 1, as shown, and may be of standard construction. An electrical conductor 10 comprising the usual lead from any suitable source of electric current is shown as entering the switch casing in the usual manner.

The heating elements or units 11 are contained within the casing or box, and as shown, comprise two in number. While I have shown two heating units, it will be understood that one or more can be utilized in varying size heaters according to the use to which the heater will be subjected.

The heating units are insulated from the casing by means of insulation 12, which may be in the form of wrappers of empire cloth or other non-conducting material. They need not be of a heavy or cumbersome nature because of the composition of the heating units, which, while radiating intense heat, do not require unusual insulation.

The units 11 are supported within the casing, and further held in place by means of a spring-like plate 13 designed to bear upon one side of the heating units, and adapted to receive the threaded end of a bolt 14 extending through the casing as clearly shown in Fig. 5. A nut 15 is threaded upon the bolt 14 and regulates the tension of the plate 13. This device serves to press the heating units against the water inlets and outlets at the back of the casing to prevent leakage.

Provided near the bottom end of each heating unit is an inlet opening 16, through which the water from the manifold 4 passes into the heating unit. Near the upper end of each heating unit is an outlet opening 17 through which the heated water flows into the manifold 3. Washers 18 are positioned in these respective openings and serve to prevent any leakage of the water. The washers are formed with an intermediate flange section 19 and oppositely extending sleeve or nipple ends 20, adapted to join the communicating openings.

The inlet opening 16 of the heating unit is in communication with a duct 21 provided in a rib section 22 carried by the back plate 23 of the heating device and the duct 21 is in communication with one end of the inlet manifold 4. The outlet 17 of each heating unit communicates with a duct 24 formed in the upper end of the aforesaid rib section 22, and is designed to permit the heated water to flow into one end of the discharge manifold 3 at the top of the heating device.

From this construction it will be seen that the water to be heated has a continuous flow through the heating device, which when once assembled, the back plate 23 carrying the rib sections 22, is preferably spot welded on to the casing of the box 1, thereby preventing any manipulation or disturbing of the interior of the device.

Each heating unit 11 is compactly constructed and is composed of oppositely arranged plates or side walls 25 into one of which the inlet and outlet openings 16 and 17, respectively, are provided. A wire conductor 26 is designed to bind the edges of each plate 25, resting within the groove 27. A terminal end 28 extends from the wire and is interconnected with the switch terminals in the usual manner. It will be understood that upon turning the switch the electric current will flow into the conductors 26 and conduct the electricity to the plates 25, one of which is positive and the other of which is negative.

Between the plates 25 is a passageway 29 preferably of zig-zag formation as clearly shown in Fig. 3. The water to be heated flows upwardly through this passageway and is retarded in its course therein sufficiently long to become hot as will be understood. The passageway 29 is preferably formed in a gasket of rubber or other suitable insulating material, and serves to separate the positive and negative plates 25. The heating unit is securely bound or clamped by a wrapping 30 which serves to prevent leakage of the water.

Each plate 25 is specially made from a heat intensifying material including antimony, copper and mercury. Powdered antimony and copper are mixed with quick silver or mercury. The mixed materials are preferably subjected for mixing with a combining or setting agent and then compressed to a relatively high degree, and subsequently baked in an oven for a period extending over several hours, it being usual to allow the plates to stay in the oven twenty-four hours.

A coating of shellac is applied to the plate before and after baking. It is desirable to apply this coating to preserve the plate, and also afford an insulating covering therefor.

When the plate is finished it produces a relatively small and thin intensified heat producing element, the ingredients of which are capable of receiving any form of electricity without damage.

In making the plates for the heating units described herein, the groove 27 is cut upon the edges thereof to a depth sufficiently to pierce the shellac or similar outer covering, so as to bring the wire or conductor 25 into actual contact with the ingredients of the plate for transmitting the current. Likewise, portions of the inner opposed faces of the plates forming the side walls of the heating unit, are ground for purposes of removing the shellac to permit the current to pass from the positive to the negative plate through the water.

The plate produced by this method is readily adapted for many uses, the ingredients of said plate being free from all damaging properties which would affect the water passing through the heating unit or the materials used in the construction of the device.

The faucet attaching device 8 is of novel construction, and comprises a frame 31 having a base 32 provided with opposite upright arms 33 and 34.

The arm 34 is formed at its upper end with a faucet engaging surface 35 preferably conforming to the contour of the faucet. The arm 33 is designed to receive a screw 35' threaded and operable therein, and having a reduced end 36 secured to a movable arm 37. The movable arm 37 is pivotally mounted in the base 32 at 38 and is formed with a faucet engaging surface 39 designed to engage the opposite side of the faucet as shown in Figs. 1 and 8. From this construction it will be seen that varying size faucets can be readily accommodated within the attaching clamp.

The attaching device is further provided with a water connection 40 comprising a plate 41 adapted to be forced upwardly by a screw 42 against the mouth or discharge end of the faucet. A washer 43 is interposed as shown and serves to prevent any leakage of the water. A chamber 44 is formed in the plate 41 into which is threaded a short nipple or pipe 45 for conveying the water from the faucet. Another nipple 46 is threaded into the plate and communicates with the chamber 44. To the end of the nipple 46 and more particularly an elbow, the hose connection 5 leading to the heating device is secured. From this construction it will be seen that the water from any ordinary spigot or faucet is readily conveyed to the heating unit without leakage.

In operation, the attaching device 8 is applied to a faucet with the hose connections arranged as heretofore described. The electric current and faucet are then turned on by manipulating the switch 9, and faucet handle, respectively, and in the course of a few seconds hot water begins to flow from the hose 7 for use as may be desired. The action of the water in flowing through the zig-zag chamber of the heating unit is to complete the circuit between the positive and negative plates 25, and by reason of the composition of the said plates the electric heat units become greatly multiplied and intensified and a maximum degree of heat is imparted to the water, in many cases causing the water to boil or to pass out of the heating device in steam.

The advantage of such heat is to purify the water, and by distilling off the pure water and catching the sediment at any point in the discharge hose 7, a particularly useful device has been produced for medical, dental and similar uses.

It will be obvious also that the device can be put into heating operation by simply turning the spigot or faucet, thereby producing an instantaneous heating device.

Various changes in the form and proportion of the several elements comprising the device may be made and I do not limit myself to the exact disclosures herein set forth.

I claim:

1. In an electrolytic water heating device, the combination with a plurality of heating units having inlets and outlets for the passage of the water, of a series of ducts connecting with said inlets and outlets, upper and lower manifolds communicating with said ducts and means including a spring clamp for holding said heating units against the aforesaid ducts to prevent leakage.

2. In an electrolytic water heater the combination with a plurality of heating units having inlets and outlets for the passage of the water, a casing inclosing said units having a back wall provided with ducts communicating with the aforesaid inlets and outlets, and upper and lower manifolds connecting said ducts for directing and discharging single streams of water into and out of the heater.

3. In an electrolytic water heating device, the combination with a plurality of heating units having inlets and outlets for the passage of the water, of a series of ducts connecting with said inlets and outlets, upper and lower manifolds communicating with said ducts and means for securing said heating units against the aforesaid ducts to prevent leakage.

4. In an electrolytic water heater, a plurality of heating units arranged to permit separate streams of water to flow through each unit, an inlet and outlet for the passage of water into and out of each unit, a series of ducts connecting with said inlets and outlets, upper and lower manifolds connecting said ducts, and a single inlet and outlet for each of the aforesaid manifolds whereby a single stream of unheated water is admitted to the heater and a single stream of heated water is discharged therefrom.

5. In an electrolytic water heater, a heating unit having inlet and outlet openings for the passage of the water, a supporting member for said heater having ducts therein arranged to communicate with the aforesaid inlet and outlet openings, a washer provided in each opening between the heating unit and each duct, and means for securing the said heating unit against the ducts in the supporting member to prevent leakage.

6. In an electrolytic water heater, a heating unit having inlet and outlet openings for the passage of the water, a supporting member for said heater having ducts therein arranged to communicate with the aforesaid inlet and outlet openings, a washer provided in each opening between the heating unit and each duct, and means including a spring clamp and screw for securing the said heating unit against the ducts in the supporting member to prevent leakage.

7. In an electrolytic water heater, a heating unit composed of spaced heating plates separated by insulation, an inlet opening and an outlet opening formed in one of said plates, ducts communicating with said openings, a supporting member in which the ducts are formed, a flanged washer interposed between each of said openings and ducts, and means for securing said heating unit against the supporting member.

8. An electric water heating device including in combination a heating element composed of oppositely arranged positive and negative plates having a passageway formed therebetween for the flow of the water, an electrical conductor surrounding each plate and contacting with the ingredients thereof, an insulating covering for each of said plates at points other than where the electrical conductor contacts with the plate and the water flows, and means for passing an electric current of high or low voltage through said heating element.

9. An electric water heating device including in combination a heating element composed of oppositely arranged positive and negative plates having a passageway formed therebetween for the flow of the water, an electrical conductor contacting with each of said plates, an insulating covering for each of said plates at points other than where the water flows and the electrical conductor contacts with the said plates, and means whereby direct or alternating electric current can be passed through the heating element for heating the water.

10. An electric water heater including in combination a relatively small heating unit composed of thin and oppositely arranged positive and negative plates having a passageway therebetween, an electrical conductor contacting with each of said plates, an insulating covering for each of said plates at points other than where the water flows and the said electrical conductor contacts with the said plates, and means for directing an electric current of high voltage through the aforesaid heating element for producing boiling water and steam.

11. An electric water heater including in combination a relatively small heating unit composed of thin and oppositely arranged positive and negative plates having a passageway therebetween, an electrical conductor contacting with each of said plates, an insulating covering for each of said plates at points other than where the said electrical conductor contacts with the said plates and where the water flows, the latter forming a heat intensifying area.

12. An electric water heater including in combination a relatively small heating unit composed of thin and oppositely arranged positive and negative plates having a passageway therebetween, an electrical conductor contacting with each of said plates, an insulating covering for each of said plates at points other than where the said electrical conductor contacts with the said plates and where the water flows, the latter forming a heat intensifying area composed of antimony, copper and mercury.

In testimony whereof I affix my signature.

HENRY J. YOUNGBLOOD.